US012681687B2

(12) United States Patent
Nabeshima

(10) Patent No.: US 12,681,687 B2
(45) Date of Patent: Jul. 14, 2026

(54) INFORMATION PROCESSING APPARATUS AND CONTROL METHOD THEREOF

(71) Applicant: CANON KABUSHIKI KAISHA, Tokyo (JP)

(72) Inventor: Rui Nabeshima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 18/765,398

(22) Filed: Jul. 8, 2024

(65) Prior Publication Data

US 2025/0021298 A1 Jan. 16, 2025

(30) Foreign Application Priority Data

Jul. 10, 2023 (JP) .................................. 2023-113129

(51) Int. Cl.
*G06F 3/16* (2006.01)
*G06F 3/01* (2006.01)
*G10K 11/178* (2006.01)

(52) U.S. Cl.
CPC .............. *G06F 3/165* (2013.01); *G06F 3/012* (2013.01); *G10K 11/17823* (2018.01)

(58) Field of Classification Search
CPC .......... G06F 3/165; G06F 3/011; G06F 3/167; G06F 3/0482; G06F 3/017; G06F 3/012; G06F 3/0484; G06F 3/013; G06F 3/04842; G06F 3/04883; G06F 3/0488; G06F 3/016; G06F 3/0481; G06F 3/04817; G06F 3/04845; G06F 3/04886; G06F 3/0346; G06F 3/16; G06F 3/04847; G06F 3/04815; G06F 3/0485; G06F 3/041; G06F 3/1454; G06F 3/01; G06F 3/14; G06F 3/0303; G06F 3/048; G06F 1/163; G06F 21/32; G06F 21/31; G06F 9/451; G06F 2203/04803
See application file for complete search history.

(56) References Cited

U.S. PATENT DOCUMENTS

| | | | |
|---|---|---|---|
| 2016/0018655 A1 | 1/2016 | Imoto | |
| 2016/0210407 A1* | 7/2016 | Hwang | .................. G16B 50/30 |
| 2016/0357491 A1 | 12/2016 | Oya | |
| 2018/0157044 A1* | 6/2018 | Choi | ......................... H04R 1/08 |
| 2020/0219314 A1* | 7/2020 | James | ................. G06F 3/04815 |
| 2021/0286502 A1* | 9/2021 | Lemay | .................... G06F 3/011 |

(Continued)

FOREIGN PATENT DOCUMENTS

| | | |
|---|---|---|
| JP | 2023-029976 A | 3/2023 |

*Primary Examiner* — Dong Hui Liang
(74) *Attorney, Agent, or Firm* — Carter, DeLuca & Farrell LLP

(57) ABSTRACT

An information processing apparatus determines whether or not a display mode of a display device has been switched from a first mode to a second mode, and the first mode and the second mode being different from each other in term of visibilities of an ambient state around a user or the first mode and the second mode being different from each other in term of whether or not an ambient state around the user is visible. In a case where the display mode has been switched from the first mode to the second mode, the information processing apparatus switches an audio output mode of an audio output device from a third mode to a fourth mode, the third mode and the fourth mode being different from each other in terms of audibilities of ambient sound around the user.

20 Claims, 5 Drawing Sheets

(56)          References Cited

U.S. PATENT DOCUMENTS

2022/0066733 A1*  3/2022  Tsuruga ................... H04R 3/00
2023/0071993 A1*  3/2023  Sztuk ................... G06V 40/171
2024/0289088 A1*  8/2024  Zhu ......................... H03G 7/00

* cited by examiner

| MODE | DISPLAY CONTENT |
|---|---|
| VR MODE | ONLY CG |
| MR MODE M1 | CG + CAPTURED IMAGE |
| MR MODE M2 | CG (PARTIALLY MASKED) + CAPTURED IMAGE |
| MR MODE M3 | CG + EDGE DISPLAY OF CAPTURED IMAGE |
| MR MODE M4 | CG (SEMI-TRANSPARENT) + CAPTURED IMAGE |

INFORMATION PROCESSING APPARATUS AND CONTROL METHOD THEREOF

BACKGROUND OF THE INVENTION

Field of the Invention

The present invention relates to an information processing apparatus and a control method of the information processing apparatus.

Description of the Related Art

Virtual reality (VR) technology is known as a technology for allowing users to experience virtual space. As a technology for seamlessly integrating real space and virtual space in real time, so-called mixed reality (MR) technology is known.

For example, as an apparatus with which such a technology can be experienced a head-mounted device, which is represented by a head mounted display (HMD), is used. The HMD operates in cooperation with external earphones and is able to display an image (video) and reproduce audio by using the earphones.

Japanese Patent Apparatus Publication No. 2023-29976 describes earphones having an external sound capturing function that makes ambient sound around the earphones more audible and a noise-canceling function that makes ambient sound around the earphones less audible.

Both the VR technology and the technique of the noise-canceling function have an advantage that the user can easily be immersed in the content (image/audio).

On the other hand, both the MR technology and the technique of the external sound capturing function have an advantage that the user can experience the content (image/audio) in a state where the content is merged with the surroundings (real world) (the user can sense a danger, communicate with people around the user, etc.).

However, the HMD (display device) and the earphones (audio output device) are different devices. Therefore, in order to adjust both the display and the audio output to appropriate states, the user needs to manually adjust both the devices, which is laborious for the user.

SUMMARY OF THE INVENTION

With the foregoing in view, it is an object of the present invention to provide a technique for reducing laborious procedures for the user and more appropriately controlling the display and the audio output.

An aspect of the present invention is an information processing apparatus that is connected to a display device to be worn on a head of a user and that controls an audio output device, the information processing apparatus including one or more processors and/or circuitry configured to: perform determination processing for determining whether or not a display mode of the display device has been switched from a first mode to a second mode, the first mode and the second mode being included in the display mode, and the first mode and the second mode being different from each other in terms of visibilities of an ambient state around the user or the first mode and the second mode being different from each other in terms of whether or not an ambient state around the user is visible; and perform, in a case where the display mode has been switched from the first mode to the second mode, switching-processing for switching an audio output mode of the audio output device from a third mode to a fourth mode, the third mode and the fourth mode being included in the audio output mode, and the third mode and the fourth mode being different from each other in terms of audibilities of ambient sound around the user, wherein display mode is switched in accordance with whether or not it is determined that there is a possibility that the user comes into contact with an object or whether an activated application is an application for the first mode or an application for the second mode. An aspect of the present invention is an information processing apparatus that controls a display device to be worn on a head of a user and that is connected to an audio output device, the information processing apparatus including one or more processors and/or circuitry configured to: perform determination processing for determining whether or not an audio output mode of the audio output device has been switched from a third mode to a fourth mode, the third mode and the fourth mode being included in the audio output mode, and the third mode and the fourth mode being different from each other in terms of audibilities of ambient sound around the user; and perform, in a case where the audio output mode has been switched from the third mode to the fourth mode, switching-processing for switching a display mode of the display device from a first mode to a second mode, the first mode and the second mode being included in the display mode, and the first mode and the second mode being different from each other in terms of visibilities of an ambient state around the user or the first mode and the second mode being different from each other in terms of whether or not an ambient state around the user is visible.

An aspect of the present invention is a control method of an information processing apparatus that is connected to a display device to be worn on a head of a user and that controls an audio output device, the control method including: determining whether or not a display mode of the display device has been switched from a first mode to a second mode, the first mode and the second mode being included in the display mode, and the first mode and the second mode being different from each other in term of visibilities of an ambient state around the user or the first mode and the second mode being different from each other in terms of whether or not an ambient state around the user is visible; and switching, in a case where the display mode has been switched from the first mode to the second mode, an audio output mode of the audio output device from a third mode to a fourth mode, the third mode and the fourth mode being included in the audio output mode, and the third mode and the fourth mode being different from each other in terms of audibilities of ambient sound around the user, wherein the display mode is switched in accordance with whether or not it is determined that there is a possibility that the user comes into contact with an object or whether an activated application is an application for the first mode or an application for the second mode. An aspect of the present invention is a control method of an information processing apparatus that controls a display device to be worn on a head of a user and that is connected to an audio output device, the control method comprising: determining whether or not an audio output mode of the audio output device has been switched from a third mode to a fourth mode, the third mode and the fourth mode being included in the audio output mode, and the third mode and the fourth mode being different from each other in terms of audibilities of ambient sound around the user; and switching, in a case where the audio output mode has been switched from the third mode to the fourth mode, a display mode of the display device from a first mode to a second mode, the first mode and the second mode being included in the display mode, and the first mode and the second mode being different from each other in terms of visibilities of an ambient state around the user or the first mode and the second mode being different from each other in terms of whether or not an ambient state around the user is visible.

Further features of the present invention will become apparent from the following description of exemplary embodiments with reference to the attached drawings.

BRIEF DESCRIPTION OF THE DRAWINGS

FIG. 1 illustrates an information processing system according to Embodiment 1;

FIG. 3 illustrates display modes according to Embodiment 1;

DESCRIPTION OF THE EMBODIMENTS

Figure 2:
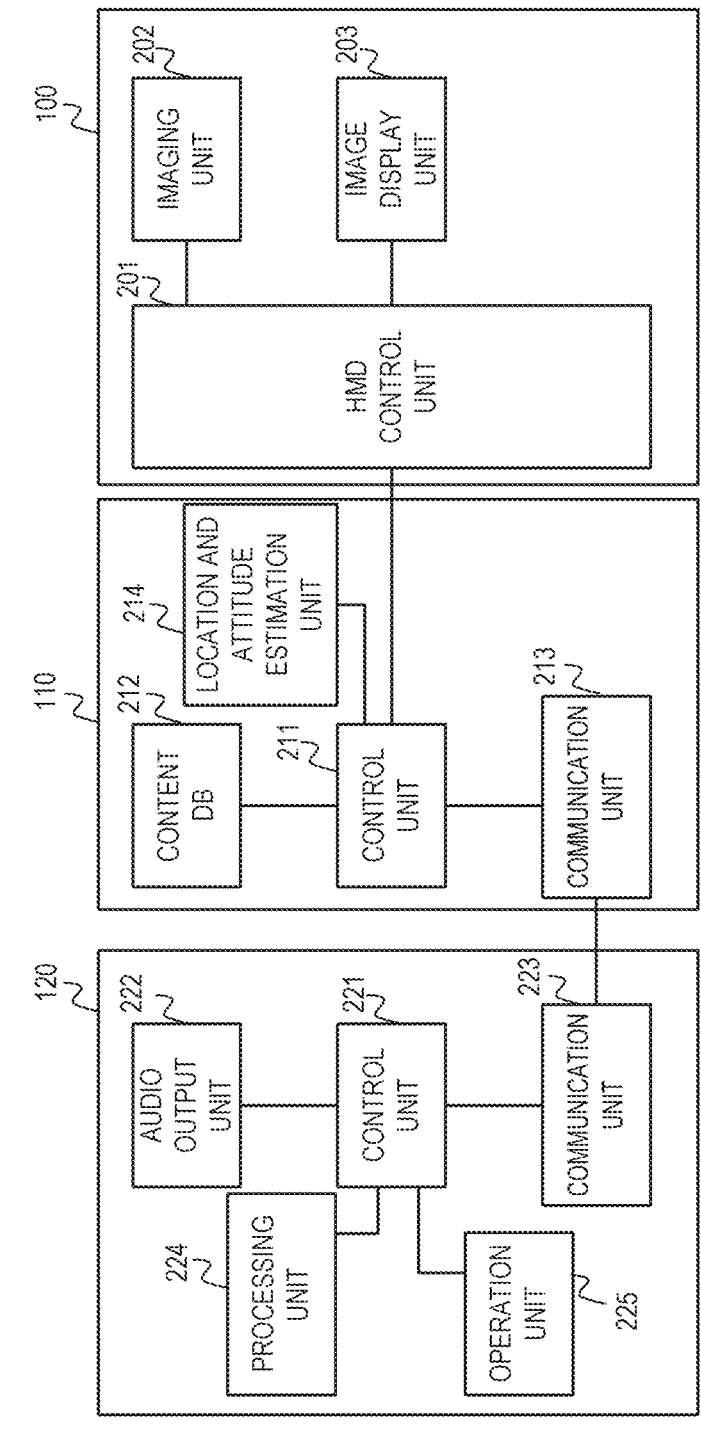
FIG. 2 illustrates configurations of an HMD, etc. according to Embodiment 1.

Hereinafter, embodiments will be described in detail with reference to the accompanying drawings. The following embodiments do not limit the invention according to the scope of claims. Although a plurality of features are described in each embodiment, all of the plurality of features are not necessarily essential to the invention, and the plurality of features may be appropriately combined. In the accompanying drawings, the same or similar components are denoted by the same reference numerals, and redundant description will be omitted. Hereinafter, the ambient sound around the user (the ambient sound around the HMD100; sounds other than the sound emitted by earphones 120) will be referred to as "external sound".

Embodiment 1

Figure 1:
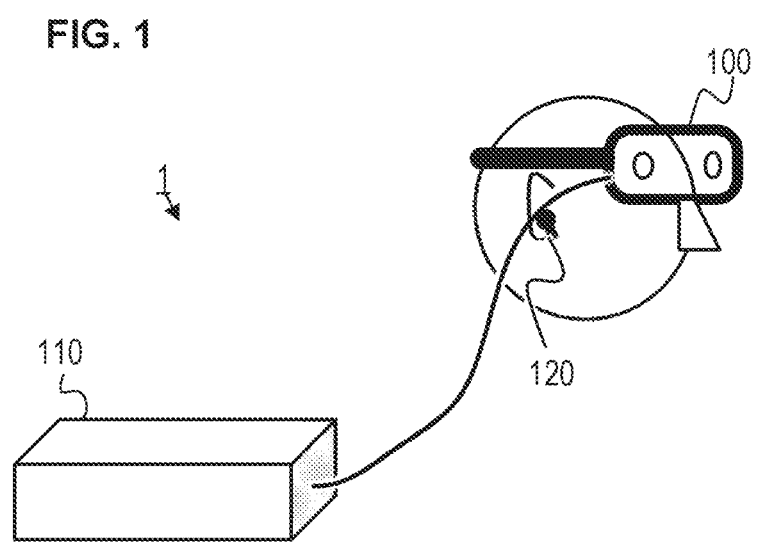

An information processing system 1 according to Embodiment 1 will be described with reference to FIG. 1. The information processing system 1 is an XR system for providing a user with virtual reality (VR) that allows the user to experience virtual space and mixed reality (MR) that integrates the real world and the virtual world. The information processing system 1 includes an HMD 100, an information processing apparatus 110, and earphones 120. The information processing apparatus 110 is connected to the HMD100 and the earphones 120. Therefore, the HMD100 connects to the earphones 120 via the information processing apparatus 110.

The HMD 100 is a head-mounted display device (electronic device) to be worn on the head of the user. The HMD 100 displays content such as computer graphics (CG) in a form corresponding to the attitude of the HMD 100. This allows the user to have a VR experience. When an image obtained by combining "an image obtained by the HMD 100 capturing an area where the user is facing (in front of the user)" with the content is used as a display image, the user can have a video see-through MR experience.

The information processing apparatus 110 is an electronic device (control apparatus) that performs various processes. The various processes include controlling the HMD 100, processing images captured by a camera mounted on the HMD 100, generating contents such as CG, generating display images to be displayed on the HMD 100, etc. The information processing apparatus 110 is configured by a computer including a CPU (processor) and a memory. For example, the information processing apparatus 110 is a smartphone, a tablet terminal, a personal computer (PC), a gaming device, or the like. The information processing apparatus 110 is connected to the HMD 100 by wireless or wired communication. The information processing apparatus 110 generates a display image and transmits the display image to the HMD 100. Each component of the information processing apparatus 110 may be built in the HMD 100.

The earphones 120 are a reproducing device (audio outputting device) capable of reproducing (outputting) audio corresponding to audio data attached to the content for the HMD100. Instead of using the earphones 120, any audio output device (for example, headphones) may be used as long as the audio output device is worn on the ears.

Internal Configuration of HMD

An internal configuration of the HMD 100 will be described with reference to FIG. 2. The HMD 100 includes an HMD control unit 201, an imaging unit 202, and an image display unit 203.

The HMD control unit 201 controls each component of the HMD 100. When the HMD control unit 201 acquires a display image from the information processing apparatus 110, the HMD control unit 201 displays the display image on the image display unit 203. The user can view the display image displayed on the image display unit 203 by wearing the HMD 100.

The imaging unit 202 includes, for example, two cameras (imaging devices). The two cameras are arranged near the positions of the left and right eyes of the user at the time of wearing the HMD100 in order to capture an image of space similar to the space that the user normally views. Images of a subject (an area in front of the user) captured by the two cameras are output to the information processing apparatus 110. The two cameras of the imaging unit 202 can acquire distance information indicating the distances from the two cameras to the subject by distance measurement using the stereo camera.

The image display unit 203 displays a display image. The image display unit 203 includes, for example, display panels (liquid crystal panels, organic EL panels, or the like). In a state where the user is wearing the HMD100, the respective display panels are positioned in front of the left and right eyes of the user.

Internal Configuration of Information Processing Apparatus

An internal configuration of the information processing apparatus 110 will be described with reference to FIG. 2. The information processing apparatus 110 includes a control unit 211, a content database (DB) 212, a communication unit 213, and a location and attitude estimation unit 214.

The control unit 211 generates a display image based on the image data of the content and transmits the display image to the HMD control unit 201.

By using a CG image as a display image, the user can experience virtual space (VR space) in which CG images are displayed. On the other hand, by using "an image obtained by combining a CG image with a captured image obtained by capturing a space in front of the user by the imaging unit 202" as a display image, the user can experience mixed reality space (MR space) in which CG images are merged with the real space.

The content DB 212 is a memory unit (storage unit) that stores "content obtained by combining CG image data and audio data", and the like. The control unit 211 can switch the content (CG used for generating a display image, etc.) read from the content DB 212.

The communication unit 213 communicates with the earphones 120 to transmit audio data of content (audio data corresponding to a display image). The communication unit 213 can also acquire the state of the earphones 120 and perform settings of the earphones 120.

The location and attitude estimation unit 214 acquires location and attitude information by estimating the location and attitude of the HMD 100. The location and attitude information indicates the absolute three-dimensional location and attitude of the HMD 100 in the real space. As a method for estimating the location and attitude, a method in which the absolute location and attitude of the HMD 100 in the real space can be measured is used. For example, an optical sensor or the like that measures the location and attitude of the HMD 100 based on a plurality of markers attached to a measurement target can be used as the location and attitude estimation unit 214. The optical sensor measures the location and attitude of the HMD 100 by analyzing (integrating) the information about the markers acquired by a plurality of cameras installed on a ceiling or the like.

A location and attitude estimation method using simultaneous localization and mapping (SLAM) can also be used. SLAM is a technique for estimating information about the three-dimensional location and attitude of an imaging device in the real space by tracking features of a natural object such as angular points appearing in a captured image in each frame. The location and attitude estimation unit 214 may measure the location and attitude of the HMD 100 by using markers or image features appearing in images captured by the imaging unit 202 of the HMD 100 without using the optical sensor. By using the location and attitude measured as described above, a CG image in which a predetermined CG model is rendered at a predetermined location and attitude can be generated.

Internal Configuration of Earphones

An internal configuration of the earphones 120 will be described with reference to FIG. 2. The earphones 120 include a control unit 221, an audio output unit 222, a communication unit 223, a processing unit 224, and an operation unit 225.

The control unit 221 controls each component of the earphones 120. The control unit 221 is configured by, for example, a small general-purpose processor, a memory, and a program. The control unit 221 may be configured by a dedicated microprocessor, an application specific integrated circuit (ASIC), or the like.

The audio output unit 222 outputs audio (emits sound) in accordance with audio data processed by the processing unit 224. The audio output unit 222 is, for example, a small speaker.

The communication unit 223 performs wireless communication with the information processing apparatus 110 (communication unit 213).

The processing unit 224 performs external sound processing corresponding to an audio output mode on the audio data of the content received via the communication unit 223. The processing unit 224 supplies the audio data on which external sound processing has been performed to the audio output unit 222. When the audio output mode is an "external sound capturing mode", the processing unit 224 performs "processing for making ambient sound more audible by adding the ambient sound (external sound) around the HMD 100 to the audio data of the content" as the "external sound processing". When the audio output mode is a "noise-canceling mode", the processing unit 224 performs "processing (noise-canceling processing) for making external sound (that is, noise) less audible on the audio data of the content" as the "external sound processing". Specifically, when the audio output mode is the "noise-canceling mode", the processing unit 224 adds a sound that makes the external sound less audible (a sound that cancels the external sound) to the audio data of the content. Note that when the audio output mode is the "noise-canceling mode", no external sound is added to the audio data of the content. The external sound may be acquired by a microphone of the HMD 100 or the like, or may be acquired by a microphone of the earphones 120 or the like.

The earphones 120 can switch the audio output mode between the "external sound capturing mode" and the "noise-canceling mode". The audio output mode may include a mode in which "the level of the external sound output (the volume of the external sound output from the audio output unit 222)" or "the level of the noise cancellation (the level of canceling the external sound)" can be adjusted.

The operation unit 225 detects a switching operation (operation by the user) of the audio output mode of the earphones 120.

In Embodiment 1, an example in which the information processing apparatus 110 and the earphones 120 are wirelessly connected to each other will be described. However, the information processing apparatus 110 and the earphones 120 may be connected to each other by wire.

Display Mode of HMD

A plurality of display modes of the HMD 100 and display images displayed on the image display unit 203 in the respective display modes will be described with reference to FIG. 3. The display modes include a VR mode and an MR mode.

In the VR mode, the display image is a VR image that includes only CG, without including an image of the real space captured by the imaging unit 202. In the VR mode, although the user can be immersed in the content, the user cannot check the surroundings of the user through the display image. That is, the VR mode is a mode in which the ambient state around the user is not visible.

In the MR mode, the display image is an MR image that includes a captured image obtained by the imaging unit 202 capturing an image of the real space.

Therefore, the user can check the surroundings through the display image. The MR mode may further include MR modes M1 to M4, which will be described below.

In the MR mode M1, the display image is a composite image obtained by combining CG with (superimposing CG on) the captured image.

In the MR mode M2, while CG are displayed, masking processing is partially performed on the CG. Therefore, the display image is an image obtained by combining the CG on which the masking processing has been performed with the captured image. The masking processing is processing for extracting a region based on color, for example, as in a chroma key composition technique.

In the MR mode M3, the display image is an image in which only the contour portion (edge) of an object appearing in the captured image is superimposed on the CG.

In the MR mode M4, the display image is an image obtained by combining the CG having increased transparency (set to be semi-transparent or fully transparent) with the captured image.

Therefore, a ratio of the area of the captured image (CG) with respect to the area of the display image (display surface) is different in each of the MR modes M1 to M4. It can be said that the MR mode M4 is "the display mode in which the user can most easily recognize the ambient state around the HMD 100" and that the MR mode M2, the MR mode M1, and the MR mode M3, in this order, are the display modes in which the user can easily recognize the ambient state around the HMD 100.

Figure 4:
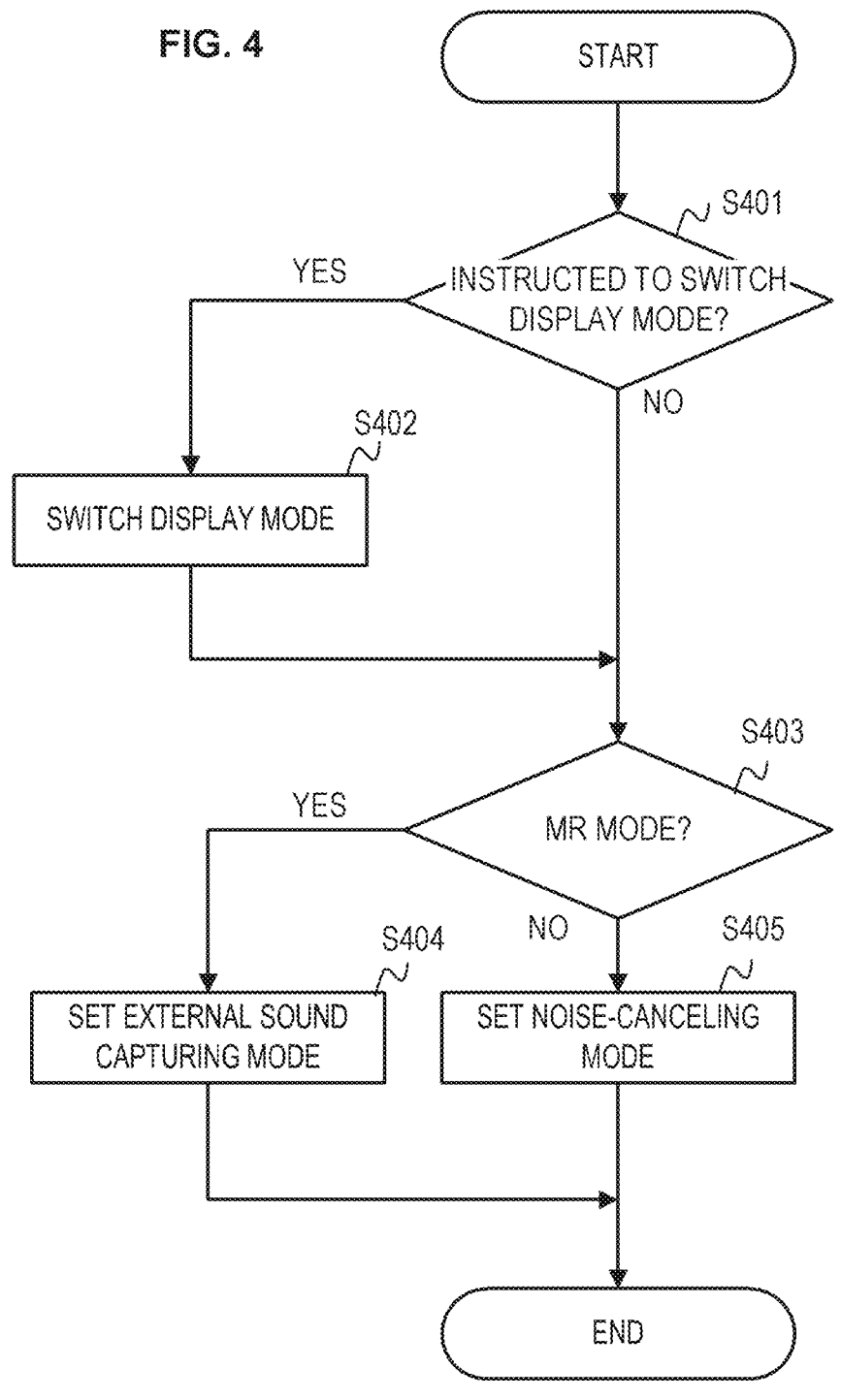
FIG. 4 is a flowchart illustrating audio output mode control processing according to Embodiment 1.

An example in which the audio output mode of the earphones 120 is controlled in accordance with the operation of the HMD 100 will be described with reference to a flowchart in FIG. 4.

In step S401, the control unit 211 determines whether or not an instruction to switch the display mode has been given to the HMD 100. If it is determined that the instruction to switch the display mode has been given, the processing proceeds to step S402. If it is determined that the instruction to switch the display mode has not been given, the processing proceeds to step S403.

For example, when an application is newly activated, if the application is a VR application, the control unit 211 determines that the instruction to switch to the VR mode has been given. When an application is newly activated, if the application is an MR application, the control unit 211 determines that the instruction to switch to the MR mode has been given. The VR application is an application for the VR mode and is an application for viewing VR images. The MR application is an application for the MR mode and is an application for viewing MR images.

Further, the VR mode and the MR mode may be switched in response to a user operation performed on a switch disposed on the HMD 100. The switch may be a button switch, a dial switch, or a slide switch.

In addition, the control unit 211 determines that the instruction to switch the display mode has been given when the user has changed the on/off state of an imaging function (function of capturing an image of the real space) of the imaging unit 202 by setting the menu or operating the button of the HMD 100. If the imaging function is turned on, the control unit 211 determines that the instruction to switch to the MR mode has been given. If the imaging function is turned off, the control unit 211 determines that the instruction to switch to the VR mode has been given.

The control unit 211 may determine whether or not the instruction to switch the display mode has been given in accordance with an instruction generated inside the HMD 100, without depending on the instruction from the user. For example, the instruction to switch the display mode may be determined when the on/off state of a safety function for checking the surroundings of the HMD 100 is changed. The safety function is turned on when the user moves out of a predetermined moving region and there is a possibility (danger) that the user could come into contact (collide) with an object (a person or a thing), and notifies the user of the danger. If the safety function is turned on to notify the user of a danger, the control unit 211 determines that the instruction to switch to the MR mode has been given. If the safety function is turned off because the danger has been avoided, the control unit 211 determines that the instruction to switch to the VR mode has been given.

In step S402, the control unit 211 switches the display mode to the display mode corresponding to the switching instruction given in step S401. That is, the control unit 211 changes whether or not the ambient state is visible or changes the visibility of the ambient state by changing the display of the HMD 100 in accordance with the instruction to switch the display mode.

The display mode may be gradually switched in accordance with the elapse of time or the amount of operation. For example, the control unit 211 may control switching speed in accordance with the amount of user operation (the degree of pressing of the button switch, the degree of rotation of the dial switch, the degree of sliding of the slide switch, or the like) for giving an instruction to switch the display mode. For example, when the mode is switched from the MR mode to the VR mode, the control unit 211 controls the display such that the region (area) of the CG gradually expands (the region of the real image gradually narrows) from the center of or the gaze point of the user on the display surface of the image display unit 203. When the mode is switched from the VR mode to the MR mode, the control unit 211 controls the display such that the region of the real image gradually expands (the region of the CG gradually narrows) from the periphery of the display surface.

In step S403, the control unit 211 determines whether or not the display mode of the HMD 100 is the MR mode. If it is determined that the display mode of the HMD 100 is the MR mode, the processing proceeds to step S404. If it is determined that the display mode of the HMD 100 is not the MR mode (the display mode of the HMD 100 is the VR mode), the processing proceeds to step S405.

In step S404, the control unit 211 sets the audio output mode of the earphones 120 to the external sound capturing mode. That is, the control unit 211 causes the earphones 120 to emit external sound. In this way, the audio output mode of the earphones 120 is switched to the external sound capturing mode in conjunction with the display mode of the HMD 100 being set to the MR mode. Thus, the audio output mode can be switched without any laborious procedures for the user, and the user can easily check the ambient state (situation) through the audio in addition to the image (display).

In step S405, the control unit 211 sets the audio output mode of the earphones 120 to the noise-canceling mode (active noise-canceling mode). That is, the control unit 211 causes the earphones 120 to emit a sound that cancels the external sound. In this way, the audio output mode of the earphones 120 is switched to the noise-canceling mode in conjunction with the display mode of the HMD 100 being changed to the VR mode. Thus, the audio output mode can be switched without any laborious procedures for the user, and the user can be immersed in the content through the audio in addition to the image (display).

The control unit 211 does not need to discontinuously switch the audio output mode of the earphones 120 between the external sound capturing mode and the noise-canceling mode. For example, the control unit 211 may switch the noise cancellation (or external sound output) level in accordance with the ratio (area ratio) of the captured image (CG) in the display image (display surface). In this case, the ratio of the CG may be determined in consideration of the transparency of the CG. For example, if the transparency of a certain CG is 20%, the ratio of the CG is set to 80% in the region of the CG, and the ratio of the captured image is set to 20%. Further, when the display mode is gradually switched, the audio output mode may be gradually switched in accordance with the speed of switching the display mode.

The audio output mode set in step S404 may be any audio output mode as long as the audibility of the ambient sound is higher in this audio output mode (the user can more easily perceive the ambient sound in this audio output mode) than in the audio output mode set in step S405. For example, the noise cancellation level of the noise-canceling mode may be set to L1 in step S404, and the noise cancellation level of the noise-canceling mode may be set to L2 (L2>L1) in step S405. In this case, the higher the noise cancellation level is, the more the ambient sound is canceled (the less audible the ambient sound becomes) in the processing. Further, the directivity of noise cancellation may be changed in accordance with a change in the noise cancellation level. When the noise cancellation level is set to be high, the directivity may be set to be high (for example, to be unidirectional), and when the noise cancellation level is set to be low, the directivity may be set to be low (for example, to be omnidirectional).

In addition, when the power of the HMD 100 is turned off or when the image display of the HMD 100 is stopped by power saving control, the control unit 211 may automatically switch the audio output mode of the earphones 120 to the external sound capturing mode. When the control unit 211 determines that the user has stopped viewing the image display unit 203 of the HMD 100, for example, the user has removed the HMD 100 or flipped up the HMD 100, the control unit 211 may switch the audio output mode of the earphones 120 to the external sound capturing mode.

As described above, according to Embodiment 1, when the display mode of the HMD 100 is switched, the audio output mode of the earphones 120 is also switched. Therefore, even if the user does not perform the operation of switching the audio output mode of the earphones 120, the audio output can be switched to the more appropriate audio output.

Embodiment 2

Figure 5:
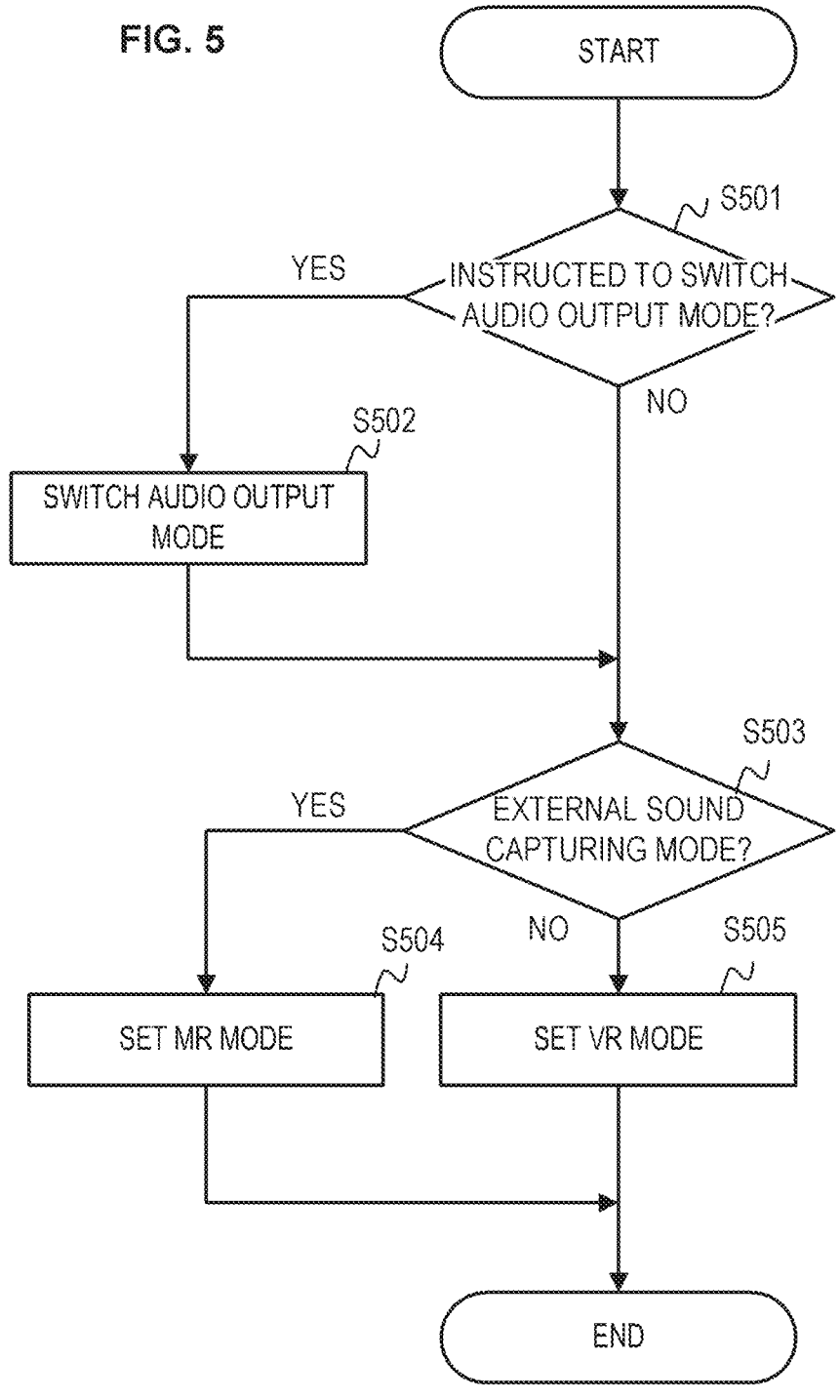
FIG. 5 is a flowchart illustrating display mode control processing according to Embodiment 2.

Processing for controlling the display mode of the HMD 100 in accordance with the operation of the earphones 120 according to Embodiment 2 will be described with reference to a flowchart in FIG. 5.

In step S501, the control unit 211 determines whether or not an instruction to switch the audio output mode has been given to the earphones 120. The instruction to switch the audio output mode can be given by the user operating the operation unit 225, for example. If it is determined that the instruction to switch the audio output mode has been given, the processing proceeds to step S502. If it is determined that the instruction to switch the audio output mode has not been given, the processing proceeds to step S503.

In step S502, the control unit 211 switches the audio output mode to the audio output mode corresponding to the instruction to switch the audio output mode. That is, in accordance with the instruction to switch the audio output mode, the control unit 211 changes the audibility (ease of hearing) of the ambient sound by changing the sound emitted by the earphones 120.

The audio output mode may be gradually switched in accordance with the elapse of time or the amount of operation. For example, the control unit 211 may control switching speed in accordance with the amount of user operation (the degree of pressing of the button switch, the degree of rotation of the dial switch, the degree of sliding of the slide switch, or the like) for giving an instruction to switch the audio output mode. For example, when the noise-canceling mode is switched to the external sound capturing mode, the control unit 211 controls the audio output such that the noise cancellation level gradually decreases, and then, the external sound capturing mode is set. When the external sound capturing mode is switched to the noise-canceling mode, the control unit 211 controls the audio output such that the output level of the external sound gradually decreases, and then, the noise-canceling mode is set.

In step S503, the control unit 211 determines whether or not the audio output mode of the earphones 120 is the external sound capturing mode. If it is determined that the audio output mode of the earphones 120 is the external sound capturing mode, the processing proceeds to step S504. If it is determined that the audio output mode of the earphones 120 is not the external sound capturing mode (the audio output mode is the noise-canceling mode), the processing proceeds to step S505.

In step S504, the control unit 211 sets the display mode of the HMD 100 to the MR mode. In this way, the display mode of the HMD 100 is switched to the MR mode in conjunction with the audio output mode of the earphones 120 being changed to the external sound capturing mode. Thus, the display mode can be switched without any laborious procedures for the user, and the user can easily check the ambient state (situation) through the image (display) in addition to the audio.

In step S505, the control unit 211 sets the display mode of the HMD 100 to the VR mode. In this way, the display mode of the HMD 100 is switched to the VR mode in conjunction with the audio output mode of the earphones 120 being changed to the noise-canceling mode. Thus, the display mode can be switched without any laborious procedures for the user, and the user can be immersed in the content through the image (display) in addition to the audio.

Further, when the audio output mode is gradually switched, the display mode may also be gradually switched in step S504 or S505 in accordance with the speed of switching the audio output mode.

When the safety function for checking the surroundings is turned on (when there is a danger that the user could come into contact with an object), the control unit 211 may maintain the MR mode as the display mode even if an instruction to switch the display mode to the noise-canceling mode has been given. Subsequently, when the control unit 211 determines that there is no longer a possibility that the user comes into contact (collides) with the object (the danger has been avoided; the safety function is turned off), the control unit 211 may switch the display mode to the VR mode.

Further, when the user removes the earphones 120, the control unit 211 may automatically change the display mode to the MR mode so that the user can check the surroundings through the HMD 100.

The display mode set in step S504 may be any display mode as long as the visibility of the ambient state (situation) is higher in this display mode (the user can more easily recognize the ambient state in this display mode) than in the display mode set in step S505. For example, the display mode may be set to the MR mode M4 in step S504, and the display mode may be set to the MR mode M3 in step S505.

As described above, according to Embodiment 2, when the audio output mode of the earphones 120 is switched, the display mode of the HMD 100 is also switched. Therefore, even if the user does not perform the operation of switching the display mode of the HMD 100, the display can be switched to the more appropriate display.

Modification 1

In Embodiments 1 and 2, the HMD 100 has been described as a video see-through HMD. However, the HMD 100 may be an optical see-through HMD. Among the optical see-through HMDs, there is an HMD capable of changing a dimming level (transmittance; transmittance level) of a display surface so as to adjust a sense of immersion. In the optical see-through HMD, the user can recognize the surroundings of (ambient state around) the user through a display surface that allows the light to pass through.

When the display surface is in the display mode in which the dimming level is high (the transmittance is low) and is in a state where the surroundings are difficult to view, the control unit 211 may automatically set the earphones 120 to the noise-canceling mode or increase the noise-canceling level. This can enhance the sense of immersion visually and auditorily.

Conversely, when the display surface is in the display mode in which the dimming level of the display surface is low (the transmittance is high) and is in a state where the surroundings are easy to view, the control unit 211 may automatically set the earphones 120 to the external sound capturing mode or increase the external sound capturing level. This allows the user to check the ambient state (situation) more easily.

As described above, according to each of the embodiments and the modification, when one of the display mode and the audio output mode is switched, the other one of the display mode and the audio output mode is switched. This reduces the laborious procedures for the user and enables more appropriate control (adjustment) of the display and the audio output.

In each of the embodiments described above, the display mode and the audio output mode are controlled such that the VR mode and the noise-canceling mode are controlled as a set and the MR mode and the external sound capturing mode are controlled as a set. However, if the user desires, the display mode and the audio output mode may be controlled such that the VR mode and the external sound capturing mode are controlled as a set and the MR mode and the noise-canceling mode are controlled as a set.

That is, for example, when the display mode is switched to the MR mode, the control unit 211 may switch the audio output mode to the noise-canceling mode. Further, when the audio output mode is switched to the external sound capturing mode, the control unit 211 may switch the display mode to the VR mode. In this way, the ambient state (situation) around the user can be checked through either the audio output or the display. Thus, the sense of immersion of the content can be secured to some extent through either the audio output or the display. That is, it is possible to adjust the balance between the sense of immersion and the safety of the user.

According to the present invention, it is possible to reduce the laborious procedures for the user and more appropriately control the display and the audio output.

The present invention has thus been described based on the preferred embodiments. However, the present invention is not limited to these specific embodiments, and various modes within the scope not departing from the gist of the present invention are also included in the present invention. Some parts of the above-described embodiments may be combined as appropriate.

In the above description, "if A is equal to or more than B, the processing proceeds to step S1, and if A is smaller (lower) than B, the processing proceeds to step S2" may be read as "if A is larger (higher) than B, the processing proceeds to step S1, and if A is equal to or less than B, the processing proceeds to S2". Conversely, "if A is larger (higher) than B, the processing proceeds to step S1, and if A is equal to or less than B, the processing proceeds to step S2" may be read as "if A is equal to or more than B, the processing proceeds to step S1, and if A is smaller (lower) than B, the processing proceed to step S2". Thus, unless a contradiction arises, the expression "equal to or more than A" may be read as "larger (higher; longer; more) than A", and the expression "equal to or less than A" may be read as "smaller (lower; shorter; less) than A". In addition, the expression "larger (higher; longer; more) than A" may be read as "equal to or more than A", and the expression "smaller (lower; shorter; less) than A" may be read as "equal to or less than A".

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-113129, filed on Jul. 10, 2023, which is hereby incorporated by reference herein in its entirety.

13

14

What is claimed is:

1. An information processing apparatus that is connected to a display device to be worn on a head of a user and that controls an audio output device, the information processing apparatus comprising one or more processors and/or circuitry configured to:

perform determination processing for determining whether or not a display mode of the display device has been switched from a first mode to a second mode, the first mode and the second mode being included in the display mode, and the first mode and the second mode being different from each other in terms of visibilities of an ambient state around the user or the first mode and the second mode being different from each other in terms of whether or not an ambient state around the user is visible; and perform, in a case where the display mode has been switched from the first mode to the second mode, switching-processing for switching an audio output mode of the audio output device from a third mode to a fourth mode, the third mode and the fourth mode being included in the audio output mode, and the third mode and the fourth mode being different from each other in terms of audibilities of ambient sound around the user, wherein the display mode is switched in accordance with whether or not it is determined that there is a possibility that the user comes into contact with an object or whether an activated application is an application for the first mode or an application for the second mode.

2. The information processing apparatus according to claim 1, wherein a sound emitted by the audio output device differs between the third mode and the fourth mode depending on control of output of ambient sound around the user by the audio output device or control of cancellation of ambient sound around the user.

3. The information processing apparatus according to claim 2, wherein at least one of the third mode and the fourth mode is a mode in which the audio output device cancels ambient sound around the user.

4. The information processing apparatus according to claim 3, wherein both the third mode and the fourth mode are modes in which the audio output device cancels ambient sound around the user, and a level of the canceling differs between the third mode and the fourth mode.

5. The information processing apparatus according to claim 2, wherein one of the third mode and the fourth mode is a mode in which the audio output device does not emit ambient sound around the user, and the other one of the third mode and the fourth mode is a mode in which the audio output device emits ambient sound around the user.

6. The information processing apparatus according to claim 2, wherein both the third mode and the fourth mode are modes in which the audio output device emits ambient sound around the user, and the ambient sound around the user emitted by the audio output device differs in terms of output level between the third mode and the fourth mode.

7. The information processing apparatus according to claim 1, wherein a display on the display device differs between the first mode and the second mode depending on control of display of a captured image obtained by capturing surroundings of the user or control of a transmittance level of a display surface of the display device.

8. The information processing apparatus according to claim 7, wherein the display device has a display surface that allows light to pass therethrough, the user is able to visually recognize surroundings of the user through the display surface, and the display surface differs in terms of transmittance level between the first mode and the second mode.

9. The information processing apparatus according to claim 7, wherein one of the first mode and the second mode is a mode in which an image including the captured image is displayed, and the other one of the first mode and the second mode is a mode in which an image including the captured image is not displayed.

10. The information processing apparatus according to claim 7, wherein both the first mode and the second mode are display modes in which a display image obtained by combining computer graphics (CG) with the captured image is displayed, and a ratio of an area of the captured image with respect to an area of the display image differs between the first mode and the second mode.

11. The information processing apparatus according to claim 1, wherein the second mode is a mode in which an ambient state around the user is not visible or a mode in which visibility of an ambient state around the user is lower than visibility of an ambient state around the user in the first mode, and the fourth mode is a mode in which audibility of ambient sound around the user is lower than audibility of ambient sound around the user in the third mode.

12. The information processing apparatus according to claim 1, wherein the first mode is a mode in which an ambient state around the user is not visible or a mode in which visibility of an ambient state around the user is lower than visibility of an ambient state around the user in the second mode, and the third mode is a mode in which audibility of ambient sound around the user is lower than audibility of ambient sound around the user in the fourth mode.

13. An information processing apparatus that controls a display device to be worn on a head of a user and that is connected to an audio output device, the information processing apparatus comprising one or more processors and/or circuitry configured to:

perform determination processing for determining whether or not an audio output mode of the audio output device has been switched from a third mode to a fourth mode, the third mode and the fourth mode being included in the audio output mode, and the third mode and the fourth mode being different from each other in terms of audibilities of ambient sound around the user; and perform, in a case where the audio output mode has been switched from the third mode to the fourth mode, switching-processing for switching a display mode of the display device from a first mode to a second mode, the first mode and the second mode being included in the display mode, and the first mode and the second mode being different from each other in terms of visibilities of an ambient state around the user or the first mode and the second mode being different from each other in terms of whether or not an ambient state around the user is visible.

14. The information processing apparatus according to claim 13, wherein the second mode is a mode in which an ambient state around the user is not visible or a mode in which visibility of an ambient state around the user is lower than visibility of an ambient state around the user in the first mode, and the fourth mode is a mode in which audibility of ambient sound around the user is lower than audibility of ambient sound around the user in the third mode.

15. The information processing apparatus according to claim 14, wherein in the switching-processing, even in a case where the audio output mode has been switched from the third mode to the fourth mode, the first mode is not switched to the second mode in a case where there is a possibility that the user comes into contact with an object.

16. The information processing apparatus according to claim 13, wherein the first mode is a mode in which an ambient state around the user is not visible or a mode in which visibility of an ambient state around the user is lower than visibility of an ambient state around the user in the second mode, and the third mode is a mode in which audibility of ambient sound around the user is lower than audibility of ambient sound around the user in the fourth mode.

17. A control method of an information processing apparatus that is connected to a display device to be worn on a head of a user and that controls an audio output device, the control method comprising:

determining whether or not a display mode of the display device has been switched from a first mode to a second mode, the first mode and the second mode being included in the display mode, and the first mode and the second mode being different from each other in term of visibilities of an ambient state around the user or the first mode and the second mode being different from each other in terms of whether or not an ambient state around the user is visible; and switching, in a case where the display mode has been switched from the first mode to the second mode, an audio output mode of the audio output device from a third mode to a fourth mode, the third mode and the fourth mode being included in the audio output mode, and the third mode and the fourth mode being different from each other in terms of audibilities of ambient sound around the user, wherein the display mode is switched in accordance with whether or not it is determined that there is a possibility that the user comes into contact with an object or whether an activated application is an application for the first mode or an application for the second mode.

18. A non-transitory computer readable medium storing thereon a program for causing a computer to execute the control method according to claim 17.

19. A control method of an information processing apparatus that controls a display device to be worn on a head of a user and that is connected to an audio output device, the control method comprising:

determining whether or not an audio output mode of the audio output device has been switched from a third mode to a fourth mode, the third mode and the fourth mode being included in the audio output mode, and the third mode and the fourth mode being different from each other in terms of audibilities of ambient sound around the user; and switching, in a case where the audio output mode has been switched from the third mode to the fourth mode, a display mode of the display device from a first mode to a second mode, the first mode and the second mode being included in the display mode, and the first mode and the second mode being different from each other in terms of visibilities of an ambient state around the user or the first mode and the second mode being different from each other in terms of whether or not an ambient state around the user is visible.

20. A non-transitory computer readable medium storing thereon a program for causing a computer to execute the control method according to claim 19.

* * * * *